(12) United States Patent
Yoo

(10) Patent No.: US 8,419,050 B2
(45) Date of Patent: Apr. 16, 2013

(54) SYSTEM FOR CONTROLLING GAS PRESSURE IN DUAL-CHAMBER AIRBAG FOR VEHICLES

(75) Inventor: Jae Haeng Yoo, Yongin-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 170 days.

(21) Appl. No.: 12/955,781

(22) Filed: Nov. 29, 2010

(65) Prior Publication Data

US 2012/0025497 A1 Feb. 2, 2012

(30) Foreign Application Priority Data

Jul. 27, 2010 (KR) .................. 10-2010-0072218

(51) Int. Cl.
*B60R 21/239* (2006.01)

(52) U.S. Cl.
USPC ........... 280/729; 280/736; 280/439; 280/742; 280/743.2

(58) Field of Classification Search .................. 280/729, 280/736, 739, 742, 743.2
See application file for complete search history.

(56) References Cited

U.S. PATENT DOCUMENTS

| | | | | |
|---|---|---|---|---|
| 5,520,413 A * | 5/1996 | Mossi et al. | ................. | 280/729 |
| 5,603,526 A * | 2/1997 | Buchanan | ..................... | 280/739 |
| 6,276,716 B1 * | 8/2001 | Kato | ............................... | 280/735 |
| 6,478,329 B1 * | 11/2002 | Yokoyama | ..................... | 280/729 |
| 7,686,333 B2 * | 3/2010 | Choi | ............................ | 280/743.2 |
| 7,695,002 B2 * | 4/2010 | Choi | ............................ | 280/729 |
| 7,938,438 B2 * | 5/2011 | Denys et al. | ................ | 280/730.2 |
| 8,020,892 B2 * | 9/2011 | Choi | ............................ | 280/743.1 |
| 2007/0257473 A1 * | 11/2007 | Choi | ............................ | 280/735 |
| 2008/0164680 A1 * | 7/2008 | Langue | ....................... | 280/728.2 |
| 2008/0252054 A1 * | 10/2008 | Kim et al. | ................... | 280/743.2 |
| 2009/0152846 A1 * | 6/2009 | Choi | ............................ | 280/729 |
| 2009/0218797 A1 * | 9/2009 | Perez Garcia | ................ | 280/742 |
| 2009/0218798 A1 * | 9/2009 | Garner | ......................... | 280/742 |
| 2010/0019473 A1 * | 1/2010 | Dennis et al. | ................. | 280/729 |
| 2010/0133797 A1 * | 6/2010 | Kim et al. | ................... | 280/743.2 |
| 2010/0201107 A1 * | 8/2010 | Abe et al. | ................... | 280/730.1 |
| 2012/0025497 A1 * | 2/2012 | Yoo | ................................ | 280/729 |
| 2012/0049491 A1 * | 3/2012 | Yoo | ................................ | 280/729 |

FOREIGN PATENT DOCUMENTS

KR 10-2009-0064182 A 6/2009

* cited by examiner

*Primary Examiner* — Paul N Dickson
*Assistant Examiner* — Karen Beck
(74) *Attorney, Agent, or Firm* — Morgan, Lewis & Bockius LLP

(57) ABSTRACT

A system for controlling gas pressure in a dual-chamber airbag for vehicles, may include a cushion unit having an upper chamber and a lower chamber divided by a diaphragm therein, an inflator supplying gas to the upper chamber, and a unidirectional vent control member provided in the diaphragm and supplying the gas inside the upper chamber into the lower chamber in one direction.

6 Claims, 5 Drawing Sheets

SYSTEM FOR CONTROLLING GAS PRESSURE IN DUAL-CHAMBER AIRBAG FOR VEHICLES

CROSS-REFERENCE TO RELATED APPLICATIONS

The present application claims priority to Korean Patent Application No. 10-2010-0072218 filed on Jul. 27, 2010, the entire contents of which application is incorporated herein for all purpose by this reference.

BACKGROUND OF THE INVENTION

1. Field of the Invention

The present invention relates, in general, to a system for controlling gas pressure in a dual-chamber airbag for vehicles and, more particularly, to a system for controlling gas pressure in a dual-chamber airbag for vehicles, in which upper and lower chambers of the airbag are sequentially expanded in response to collision impact and, thereafter, are controlled, separately.

2. Description of Related Art

An airbag device is a safety device, in which, when a passenger's body leans forward suddenly due to a car collision or a crashing halt, an airbag cushion expands quickly and prevents the passenger's body from directly striking a steering wheel or a dashboard, thus protecting the passenger from impact by absorbing the impact.

FIG. 4 shows an airbag cushion 10 of a conventional airbag device, which includes a cushion unit defining a single chamber therein and having a front cushion part 11 and a rear cushion part 12. The airbag cushion 10 further includes a tether 20 for maintaining a desired shape of the cushion unit in an expanded state, and a vent hole 30 for expelling gas from the cushion unit 10 after expansion so as to disperse impact applied to the passenger.

In a car collision, a collision sensor of the above-mentioned airbag device senses the collision impact and outputs a collision signal designating the collision impact to an ECU and, in response to the collision signal, the ECU determines whether it is required to actuate an inflator or not according to the collision impact designated by the collision signal. When the inflator is actuated by the ECU, the inflator burns a gas forming agent and injects a large amount of airbag gas into the airbag cushion, thus expanding the airbag cushion.

However, the above-mentioned conventional airbag device is problematic in that the airbag cushion comprises a single chamber, so that the airbag device may cause severe damage to the throat of a dummy due to relative movement between the head and the chest of the dummy caused by a difference in the weight between them in the NCAP (New Car Assessment Program) environment.

Further, in the related art, an airbag cushion having a large interior volume has been proposed. Although the airbag cushion having the large interior volume has an increased energy absorption rate and increases the dummy acceleration values, the airbag cushion is problematic in that it may compress the chest of the dummy in the NCAP environment, thus reducing the displacement values of the dummy chest.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a system for controlling gas pressure in a dual-chamber airbag for vehicles, which can control an upper chamber and a lower chamber of the airbag separately, thus effectively protecting the head and chest of a passenger from impact.

In an aspect of the present invention, the system for controlling gas pressure in a dual-chamber airbag for vehicles, may include a cushion unit having an upper chamber and a lower chamber divided by a diaphragm therein, an inflator supplying gas to the upper chamber, and a unidirectional vent control member provided in the diaphragm and supplying the gas inside the upper chamber into the lower chamber in one direction.

The system may further may include an active vent unit provided in the upper chamber and opened in response to a signal, and a control unit for applying the signal to the active vent unit in a predetermined time period after start of expansion of the cushion unit.

Within the predetermined time period, the gas inside the upper chamber may flow to the lower chamber through the unidirectional vent control member in the one direction, and after the predetermined time period, the gas inside the upper chamber may be expelled to atmosphere through the active vent unit opened in response to the signal of the control unit, so that gas of the upper chamber and the lower chamber may be sequentially controlled.

The predetermined time period may be a duration between the start of expansion of the cushion unit approximately till the time that the gas pressure inside the upper chamber becomes equal to the gas pressure of the lower chamber.

The unidirectional vent control member may include a vent hole formed in the diaphragm, and a flap sewn at opposite ends thereof to the diaphragm below the diaphragm in the lower chamber such that the flap selectively covers the unidirectional vent hole.

When the gas pressure inside the upper chamber may be higher than that of the lower chamber, the flap opens the vent hole by a pressure difference between the upper and lower chambers, and when the gas pressure inside the upper chamber may be lower than that of the lower chamber, the flap closes the vent hole by the pressure difference between the upper and lower chambers.

The system may further may include an active vent unit provided in the upper chamber and opened in response to a signal, and a control unit for applying the signal to the active vent unit when the cushion unit determines that the gas pressure inside the upper chamber becomes equal to or greater than that of the lower chamber.

In another aspect of the present invention, a method of controlling gas pressure in a dual-chamber airbag for vehicles, may include supplying gas in an upper chamber of the dual-chamber for a predetermined time period such that the gas inside the upper chamber flows to a lower chamber through an unidirectional vent control member in one direction, and expelling the gas inside the upper chamber to atmosphere after the predetermined time period through the active vent unit.

In further another aspect of the present invention, a method of controlling gas pressure in a dual-chamber airbag for vehicles, may include supplying gas in an upper chamber of the dual-chamber such that the gas inside the upper chamber flows to a lower chamber through an unidirectional vent control member in one direction, expelling the gas inside the upper chamber to atmosphere when it is determined that the gas pressure inside the upper chamber becomes equal to or greater than that of the lower chamber.

The present invention is advantageous as follows.

First, the present invention comprises two chambers, which can be controlled separately, thus effectively protecting the upper and lower parts of a passenger's body from impact.

Second, the present invention has the unidirectional vent controller, which can guide gas in only one direction, so that, even when pressure inside the upper chamber is reduced, desired pressure inside the lower chamber can be maintained continuously, thus reducing the passenger's chest behavior relative to the passenger's head behavior and thereby preventing damage to the passenger's throat.

Third, in the present invention, the active vent unit is opened in the late stage of expansion of the cushion unit, so that the expansion of the cushion can be effectively executed within the time after a car collision.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
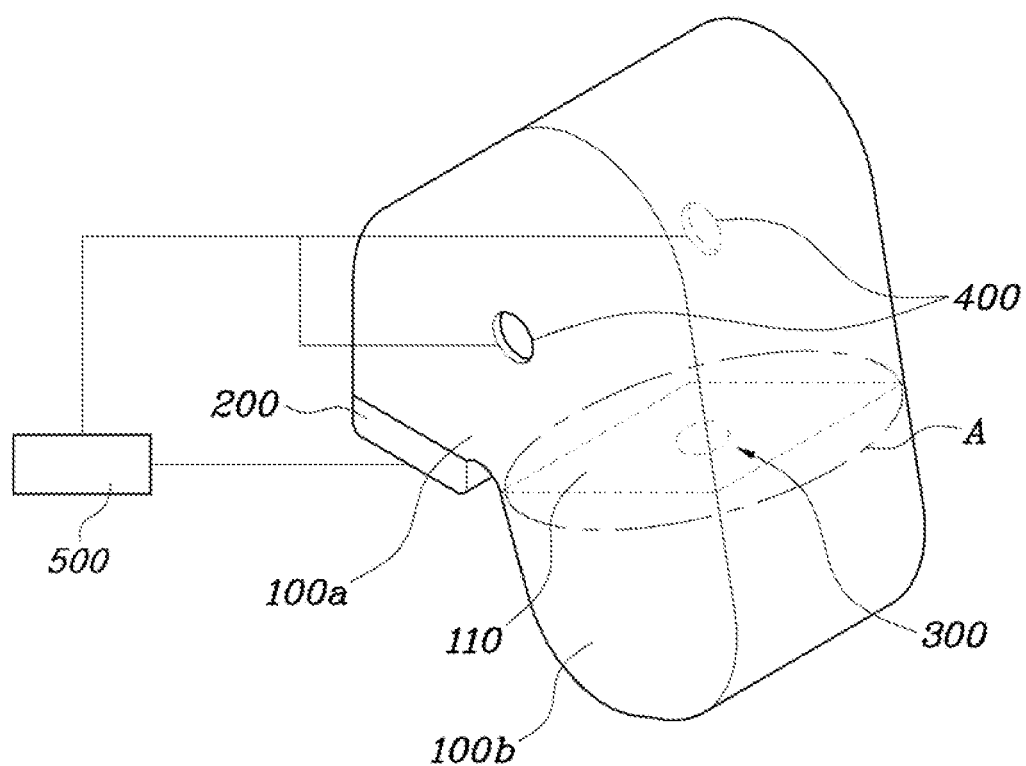
FIG. 1 is a view illustrating the construction of a system for controlling gas pressure in a dual-chamber airbag for vehicles according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2A:
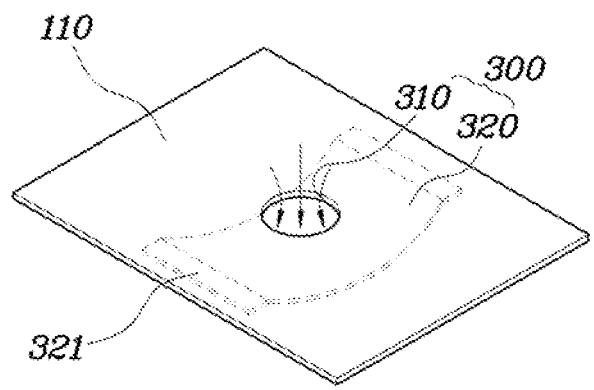
FIG. 2A and FIG. 2B are enlarged views of part A of FIG. 1.
Figure 2B:
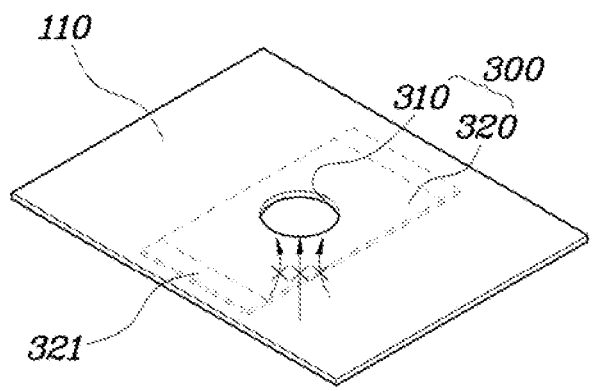

As shown in FIG. 1 through FIG. 2B, the system for controlling gas pressure in a dual-chamber airbag for vehicles according to an exemplary embodiment of the present invention expands an upper chamber 110a and a lower chamber 110b sequentially in response to a car collision and, thereafter, controls the gas pressure inside the two chambers such that the gas pressure inside the upper chamber 110a can be reduced and the gas pressure inside the lower chamber 110b can be maintained, thus realizing separate control for the gas pressure inside the upper chamber 110a and the lower chamber 110b.

The gas pressure control system includes a cushion unit 100, an inflator 200, a unidirectional vent control member 300, an active vent unit 400 and a control unit 500.

The cushion unit 100 includes an upper chamber 110a for protecting the upper body of a passenger and a lower chamber 110b for protecting the lower part of the passenger. The upper chamber 110a and the lower chamber 110b are separated from each other by a diaphragm 110, thus forming individual chambers. In the present embodiment, the diaphragm 110 is located in a central portion inside the cushion unit. However, it should be understood that the diaphragm may be located in the upper portion or in the lower portion of the cushion unit according to variables, such as the size of the cushion unit 100 and the expansion pressure of the inflator 200.

The inflator 200 is located inside the upper chamber 110a of the cushion unit 100. The inflator 200 burns a gas forming agent in response to a car collision, and supplies a large amount of gas to the cushion unit 100. In the above state, the inflator 200 communicates with the upper chamber 110a such that gas can flow from the upper chamber 110a to the lower chamber 110b in the initial stage of expansion of the cushion unit 100.

The unidirectional vent control member 300 is provided in the diaphragm 110 of the cushion unit 100. The unidirectional vent control member 300 functions to supply the gas from the upper chamber 110a to the lower chamber 110b in only one direction. The unidirectional vent control member 300 includes at least one vent hole 310 formed through the diaphragm 110 and a flap 320 sewn at opposite ends thereof to the diaphragm 110 in the lower chamber 110b such that, when the upper chamber 110a is inflated with gas, the flap 320 can close the vent hole 310.

In other words, the flap 320 is mounted at sewing parts 321 provided in the respective ends thereof to the diaphragm 110 in the lower chamber 110b. Particularly, when the pressure inside the upper chamber 110a is higher than that of the lower chamber 110b, the gas inside the upper chamber 110a pushes the flap 320 toward the lower chamber 110b such that a space can be formed between the flap 320 and the vent hole 310, thus opening the vent hole 310. However, when the pressure inside the upper chamber 110a is lower than that of the lower chamber 110b, the gas inside the lower chamber 110b pushes the flap 320 towards the upper chamber 110a, thus closing the vent hole 310.

The active vent unit 400 is provided in the upper chamber 110a of the cushion unit 100. The active vent unit 400 is configured such that it can be opened in response to an electric signal. In the initial stage of expansion of the cushion unit 100, the active vent unit 400 is maintained in a closed state, so that the upper chamber 110a can be inflated with the gas supplied from the inflator 200. In the late stage of expansion of the cushion unit 100, the active vent unit 400 is opened in response to an electric signal output from the control unit 500, thus expelling the gas from the upper chamber 110a. In an exemplary embodiment of the present invention, a typical electronic control valve, which can be opened or closed in response to an electric signal output from the control unit 500, may be used as the active vent unit 400.

Here, the technical term "control unit" means a device which includes a typical ECU. The control unit 500 can determine whether it is required to actuate the inflator 200 or not according to the collision impact designated by a collision signal output from a collision sensor in the event of a car collision. In the late stage of expansion of the cushion unit 100, the control unit 500 applies an electric signal to the active vent unit 400 so as to open the active vent unit 400.

Hereinbelow, operation of the above-mentioned control system according to an exemplary embodiment of the present invention will be described.

Figure 3A:
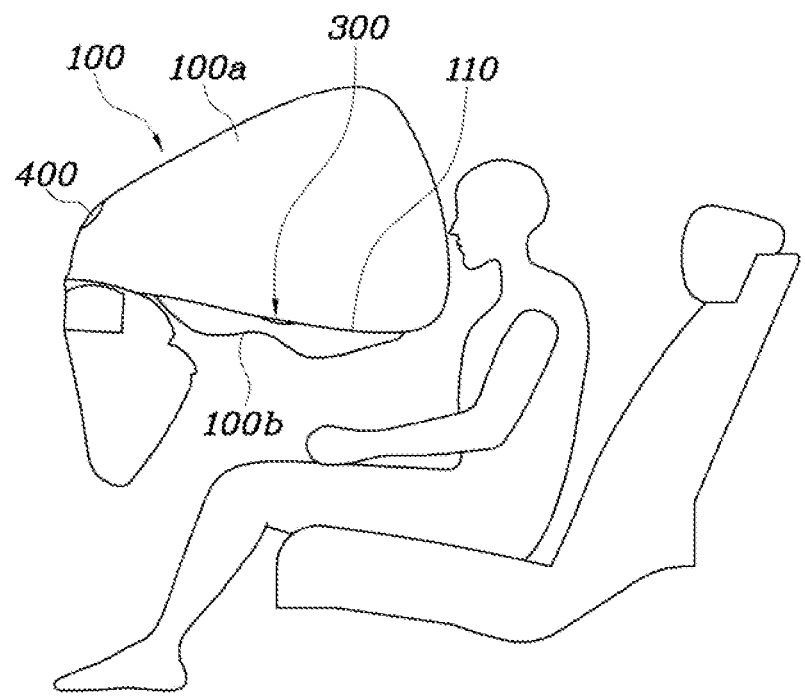
FIG. 3A through FIG. 3C are views illustrating operation of the gas pressure controlling system of the present invention.

As shown in FIG. 3A, in a car collision, the control unit 500 actuates the inflator 200 in response to a collision signal output from the collision sensor, thus expanding the upper chamber 110a of the cushion unit 100. In the above state, the active vent unit 400 is maintained in a closed state, while the unidirectional vent control member 300 is maintained in an open state, so that part of the gas inside the upper chamber 110a flows to the lower chamber 110b through the unidirectional vent control member 300.

Figure 3B:
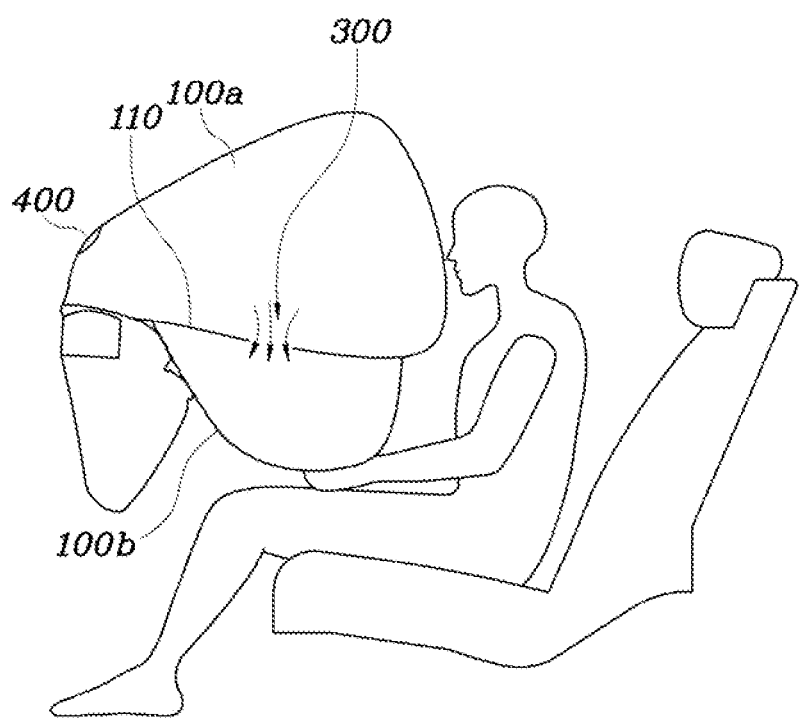

As shown in FIG. 3B, when the amount of gas flowing into the upper chamber 110a in the initial stage of expansion of the cushion unit 100 is increased, the amount of gas flowing into the lower chamber 110b through the unidirectional vent control member 300 is also increased, so that the gas pressure inside the upper chamber 110a becomes equal to that of the lower chamber 110b and thereby the vent hole 310 formed in the diaphragm 110 is closed by the flap 320 and, at the same time, the upper chamber 110a and the lower chamber 110b are isolated from each other.

Figure 3C:
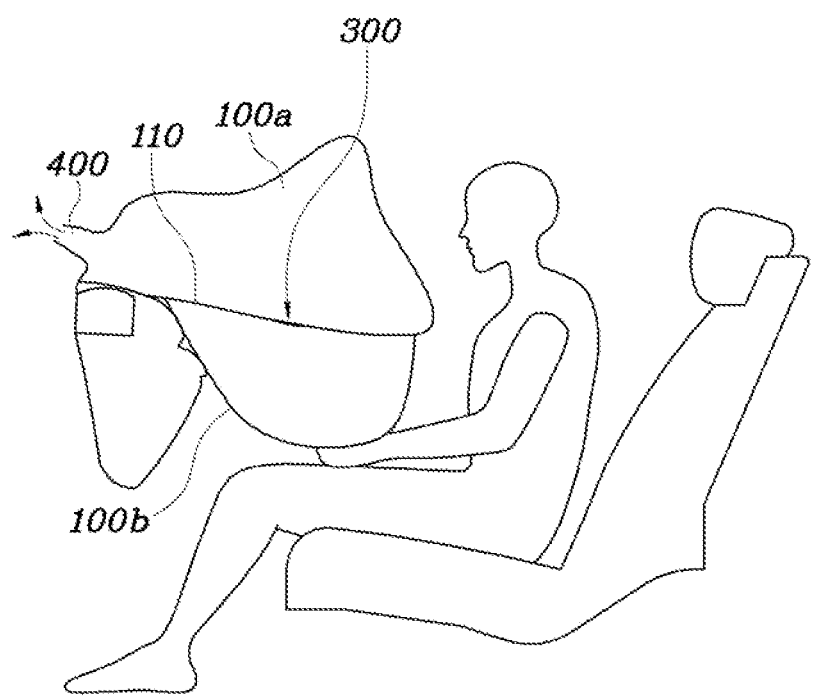
Figure 4:
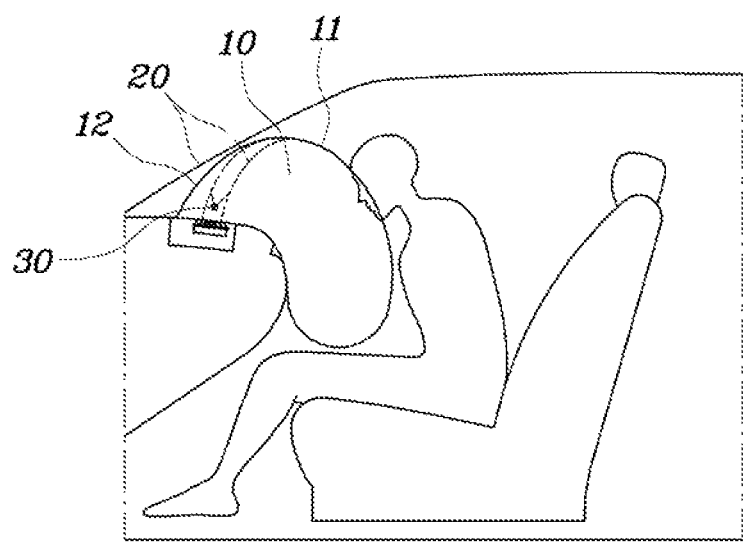
FIG. 4 is a view illustrating a conventional airbag device for vehicles.

As shown in FIG. 3C, when an electric signal output from the control unit 500 is applied to the active vent unit 400 in the late stage of expansion of the cushion unit 100, the active vent unit 400 is opened in response to the electric signal. In the above state, the gas inside the upper chamber 110a is expelled to the atmosphere through the opened active vent unit 400.

In an exemplary embodiment of the present invention, the active vent unit 400 may be configured such that it can be opened when the cushion unit 100 determines by sensing device that the gas pressure inside the upper chamber 110a becomes equal to or greater than that of the lower chamber 110b.

As apparent from the above description, the gas pressure control system according to an exemplary embodiment of the present invention provides advantages in that the system can realize separate control of the gas pressure inside the upper and lower chambers of the cushion unit in a way such that, although the gas pressure inside the upper chamber is reduced, the gas pressure inside the lower chamber can be maintained continuously, thus reducing the passenger's chest behavior relative to the passenger's head behavior and thereby preventing damage to the throat of the passenger. Therefore, the present invention can solve the problem experienced in the related art, in which the entire pressure of the airbag cushion is reduced, so that the chest behavior relative to the head behavior is excessively increased and damages the throat of a passenger.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for controlling gas pressure in a dual-chamber airbag for vehicles, comprising:
   a cushion unit having an upper chamber and a lower chamber divided by a diaphragm therein;
   an inflator supplying gas to the upper chamber;
   a unidirectional vent control member provided in the diaphragm and supplying the gas inside the upper chamber into the lower chamber in one direction;
   an active vent unit provided in the upper chamber and opened in response to a signal; and
   a control unit for applying the signal to the active vent unit when the cushion unit determines that the gas pressure inside the upper chamber becomes equal to or greater than that of the lower chamber.

2. The system according to claim 1, further comprising:
   an active vent unit provided in the upper chamber and opened in response to a signal; and
   a control unit for applying the signal to the active vent unit in a predetermined time period after start of expansion of the cushion unit.

3. The system according to claim 2, wherein, within the predetermined time period, the gas inside the upper chamber flows to the lower chamber through the unidirectional vent control member in the one direction, and after the predetermined time period, the gas inside the upper chamber is expelled to atmosphere through the active vent unit opened in response to the signal of the control unit, so that gas of the upper chamber and the lower chamber are sequentially controlled.

4. The system according to claim 3, wherein the predetermined time period is a duration between the start of expansion of the cushion unit approximately till the time that the gas pressure inside the upper chamber becomes equal to the gas pressure of the lower chamber.

5. The system according to claim 2, wherein the unidirectional vent control member comprises:
   a vent hole formed in the diaphragm; and
   a flap sewn at opposite ends thereof to the diaphragm below the diaphragm in the lower chamber such that the flap selectively covers the unidirectional vent hole.

6. The system according to claim 5, wherein, when the gas pressure inside the upper chamber is higher than that of the lower chamber, the flap opens the vent hole by a pressure difference between the upper and lower chambers, and when the gas pressure inside the upper chamber is lower than that of the lower chamber, the flap closes the vent hole by the pressure difference between the upper and lower chambers.

* * * * *